United States Patent [19]

Nagano

[11] Patent Number: 4,823,915

[45] Date of Patent: Apr. 25, 1989

[54] OPERATING FORCE TRANSMISSION DEVICE FOR A BRAKE

[75] Inventor: Masashi Nagano, Izumi, Japan

[73] Assignee: Shimano Industrial Company Limited, Osaka, Japan

[21] Appl. No.: 155,044

[22] Filed: Feb. 11, 1988

[30] Foreign Application Priority Data

Feb. 17, 1987 [JP] Japan .................. 62-34244

[51] Int. Cl.⁴ .......................... B60T 1/00; B62L 5/20; B62L 1/06; G05G 1/00
[52] U.S. Cl. ..................... 188/2 D; 74/470; 74/500.5; 188/24.15; 188/24.19
[58] Field of Search ............ 188/2 D, 26, 24.11, 188/24.15, 24.22, 71.7, 59, 382, 24, 19; 74/470, 582, 501 R, 489, 501 E; 192/99 S, 70.25, 111 A, 111 B

[56] References Cited

U.S. PATENT DOCUMENTS 3,941,215  3/1976  Schoch ........................... 188/2 D X
4,015,690  4/1977  Armstrong ..................... 188/24.15
4,057,127  11/1977  Woodring ...................... 188/2 D X
4,351,418  9/1982  Woodring et al. ............. 188/2 D X
4,480,720  11/1984  Shimano ...................... 188/24.22 X

FOREIGN PATENT DOCUMENTS 420987  12/1934  United Kingdom .

Primary Examiner—Andres Kashnikow
Assistant Examiner—Robert J. Oberleitner
Attorney, Agent, or Firm—Stevens, Davis, Miller & Mosher

[57] ABSTRACT

An operating force transmission device for a brake which transmits an input operating force applied to a brake lever to operating members of the brake through a control cable formed of an inner wire disposed within an outer sheath and interconnecting the brake. The device includes a housing, a receiving member supported movably relative to the housing and adapted to retain thereto one of the inner wire and the outer sheath of the control cable. A control spring is provided for deflecting in response to a braking force output of the operating members of the brake in excess of a predetermined magnitude to enable the receiving member to move relative to the housing when the predetermined braking force output magnitude is exceeded. This reduces the magnitude of a further braking force output of the operating members of the brake with respect to the magnitude of the input operating force applied to the brake lever and transmitted to the operating members of the brake. An adjuster is provided to adjust the spring force of the control spring to change the predetermined braking force output magnitude at which the control spring deflects to enable the receiving member to move relative to the housing.

7 Claims, 3 Drawing Sheets

Lever Stroke
(OPERATING FORCE APPLIED TO BRAKE LEVER)

OPERATING FORCE TRANSMISSION DEVICE FOR A BRAKE

FIELD OF THE INVENTION

The present invention relates to an operating force transmission device for a brake, and more particularly to an operating force transmission device for a brake preferably for a bicycle, which transmits an operating force of a brake lever to operating members of the brake through a control cable comprising an inner wire and an outer sheath.

BACKGROUND OF THE INVENTION

Generally, an operating force of a bicycle brake lever is transmitted to, for example, brake shoes of a caliper brake or a brake band at a band brake, by use of a control cable comprising an inner wire and an outer sheath; the brake lever is moved forwardly to pull the inner wire so as to actuate the operating members of the brake and bring them into press-contact with the braked portion of the bicycle wheel, thereby exerting the braking action.

The operating members of the brake are brought into press-contact with the braked portion of the bicycle wheel to reduce the rotational speed or stop the wheel rotation. When the bicycle is intended to be stopped, at a skid start region wherein the bicycle body moves by a force of inertia in the state of locking the wheel rotation, in other words, a region (hereinafter referred to as the skid point) from just before to just after the start of locking the wheel rotation, the largest braking effect is obtained.

Therefore, it is preferable when exerting the braking action on the bicycle body to control and hold an operating force of the brake lever at the skid point.

Additionally, in a case where the braking action is frequently exerted on the bicycle when running on a downward slope, it is required to operate the brake lever for enabling the braking action to be exerted under a desired press-contacting force.

The conventional operating force transmission device for a brake, when the brake lever is operated, outputs an operating force from the operating member corresponding to the magnitude of an input applied thereto, whereby the press-contacting forces applied from the operating members to the braked portion, as shown in FIG. 7; increase from the starting point C of press-contact of the operating members with the braked portion in proportion to the stroke of the brake lever. Hence, a control range of the brake lever at the skid point is small. Also, when the braking action is frequently exerted during the bicycle's running on a downward slope, the control range of the brake lever in a region where the desired braking action is required is small too. Accordingly, a problem has been created in that the braking efficiency is poor.

SUMMARY OF THE INVENTION

An object of the invention is to provide an operating force transmission device for a brake, wherein the control range of the brake lever is increased even at the skid point or in a range where a desired braking action is required while running on a downward slope, thereby improving the braking efficiency and also enabling proper adjustment of the control range of the brake lever corresponding to the skid region for different body weights of cyclists, different tires of the bicycle wheel and different kinds of operating members of the brake, or different of downward slope.

The operating force transmission device of the present invention for transmitting the operating force of the brake lever to the operating members of the brake through a control cable comprising an inner wire and outer sheath, is provided with a housing, a receiving member supported movably to the housing and the retaining one of the inner wire and outer sheath, a control spring which, when the brake lever is operated to increase an output of the brake more than a predetermined value, deflects to move the receiving member to thereby decrease the putput from the operating member with respect to the input to be applied thereto, and an adjuster which adjusts a spring force of the control spring and changes an output value of the brake when the receiving member moves.

The control spring, when the brake lever is operated, is adjusted to deflect at the skid point of the region where a desired braking action is intended to be exerted on the downward slope. More particularly, from the starting point of press-contact with the braked portion to just before the skid point or the region wherein a desired braking action is required on the downward slope, the braking effect is obtained by an output value (press-contacting force) in proportion to the input to the operating member. And, at the skid point or in the above-mentioned region, the control spring deflects to decrease the output value (press-contacting force) with respect to the operating member at the brake, thereby enlarging the control range of the brake lever at both these regions to improve the braking efficiency. Furthermore, the adjuster can be operated to desirably adjust the control spring to be deflected at the optimum region corresponding to differences in cyclist, wheel, brake, or region wherein the desired press-contacting force is obtained on the downward slope, thereby always providing an improved braking efficiency.

These and other objects of the invention will become more apparent in the detailed description and examples which follow.

DETAILED DESCRIPTION OF THE INVENTION

Figure 5:
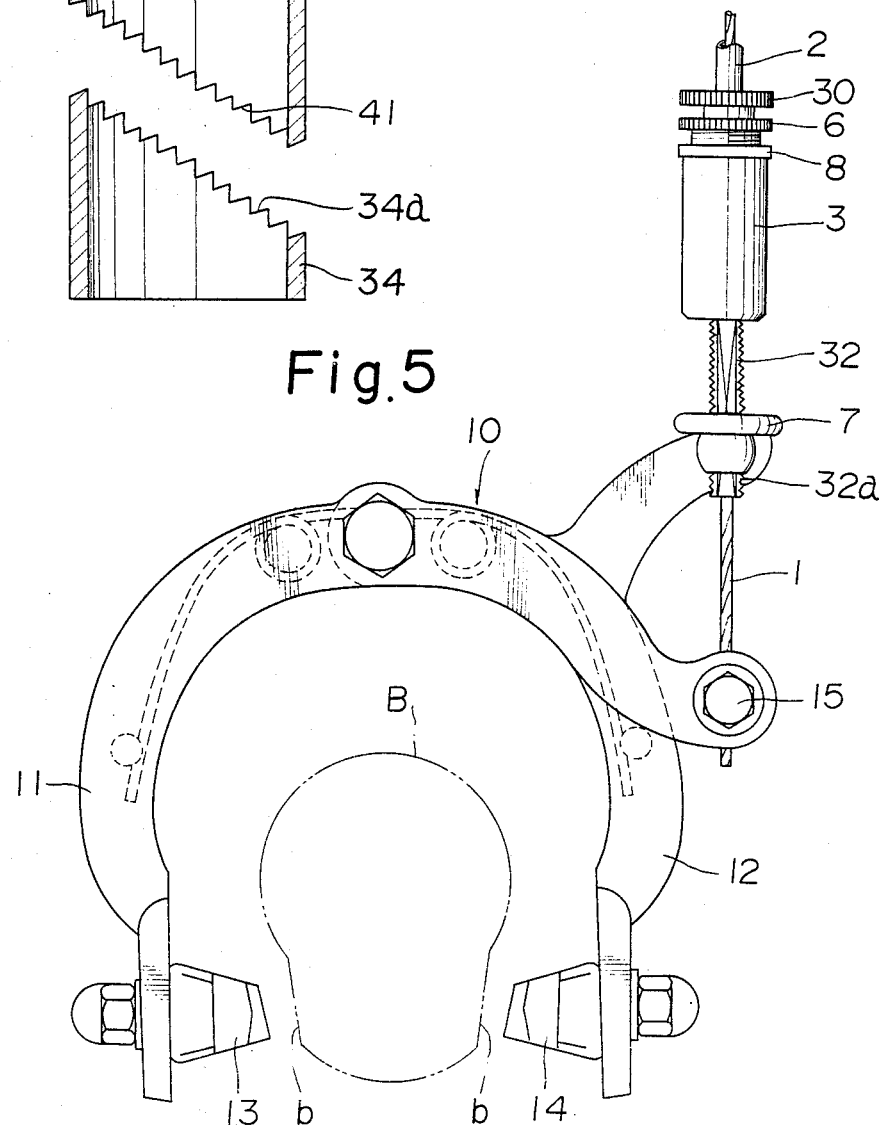
FIG. 5 is a view showing of a side-pull type caliper brake to which the present invention is applied.

Referring to FIG. 5, a brake 10 of a side-pull type caliper brake is shown which is provided with a substantially C-shaped arm 11 provided with a brake shoe 13 and substantially Y-shaped arm 12 provided with a brake shoe 14. Brake 10 is adapted to transmit to operating members, that is, the arms 11 and 12, through a control cable A comprising an inner wire 1 and an outer sheath 2 guiding the inner wire 1 an operating force of a brake lever (not shown) supported to the bicycle handle through a bracket member. Brake shoes 13, 14, apply a braking force to bicycle wheel B at braked portions b thereof. Inner wire 1 is supported at one end thereof to the brake lever and at its other end to one of the arms 11 and 12 through a fixture 15. Outer sheath 2 being supported at one end thereof to the bracket member and at its other end to the other of the arms 11 and 12 through an operating force transmission device of the invention discussed in detail below.

Figure 1:
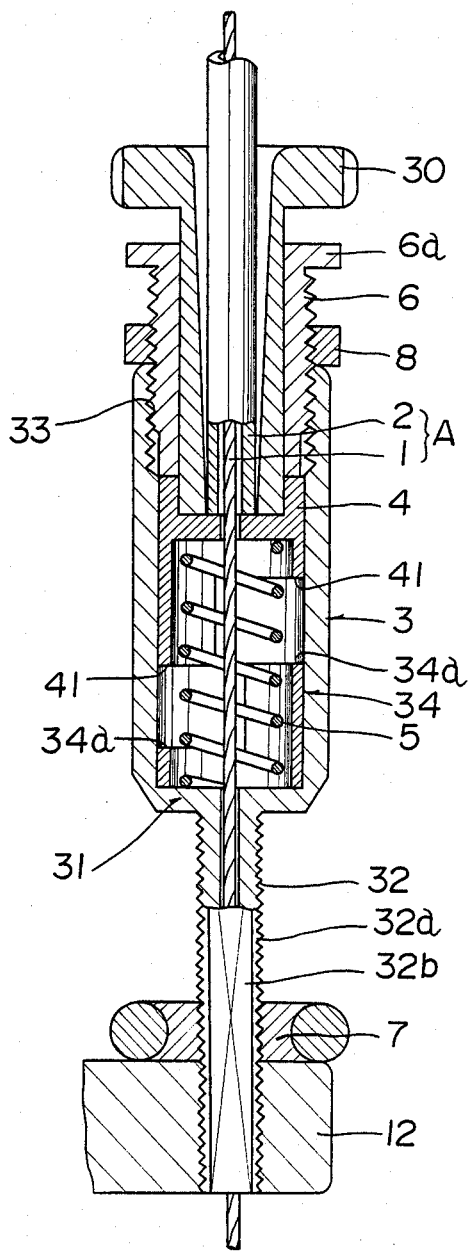
FIG. 1 is a longitudinal sectional view of a first embodiment of an operating force transmission device of the invention.
Figure 2:
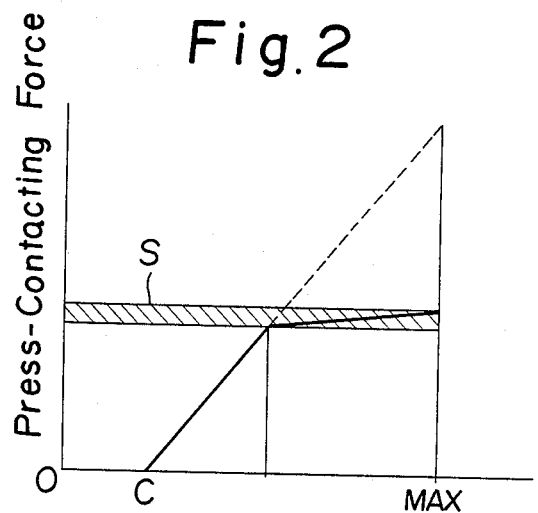
FIG. 2 is a graph illustrating the relationship between the lever stroke and the output of the brake.
Figure 3:
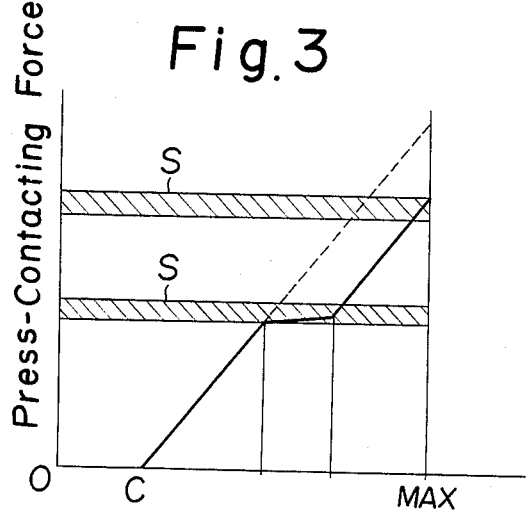
FIG. 3 is a graph illustrating another relationship between the lever stroke and the brake output when a stopper means is used.

A first embodiment of the operating force transmission device shown in FIG. 1 is provided with a tubular housing 3 mounted on the Y-shaped arm 12 at the brake 10, a receiving member 4 which is supported in the housing 3 to movable lengthwise thereof and receives the other end of outer sheath 2, a control spring 5 which is interposed between the housing 3 and the receiving member 4 and deflects when an output of the brake 10 exceeds a predetermined value during the operation of the brake lever, so as to move the receiving member 4 and reduce the output with respect to the input to be given to the arms 11 and 12, and an adjuster 6 which screws with the housing 3 so as to adjust a spring force of the control spring 5 and change an output value of the brake 10 when the receiving member 4 moves. Receiving member 4 is adapted to retain thereto one of the inner wire and the outer sheath of the control cable.

The housing 3 comprises a tube which is bottomed 31 at one lengthwise end and open at the other end and has a tubular mounting shaft 32 extending outwardly from the bottom 31 and at the inner surface of the open end side a screw thread 33. The receiving member 4 is housed axially movably in the housing 3, the adjusting member 6 screwing with the screw thread 33 so that the adjusting member 6 is adapted to screwably adjust the receiving member 4 in position in the housing 3.

The mounting shaft 32 is provided at the outer periphery thereof with a screw thread 32a and a flat locking face 32b, and supported movably axially only with respect to the Y-shaped arm 12, the screw thread 32a screwing with a nut 7 so that the nut 7 is rotated to adjust a height of the housing 3 with respect to the arm 12.

The adjusting member 6 is tubular and has a through bore through which the inner wire 1 passes and has at its upper end a rotary operation portion 6a.

In addition, in FIG. 1, a lock nut 8 locks the adjusting member 6.

In the first embodiment of the invention constructed as described above, the brake lever is operated to pull the inner wire 1 so that the reaction force resulting therefrom acts on the receiving member 4 through the outer sheath 2. The pulling force and reaction force move the arms 11 and 12 toward each other to bring the brake shoes 13 and 14 into press contact with the braked portion at the bicycle wheel. Also, the adjuster 6 is operated to adjust a spring force of the control spring 5, so that the control spring 5 does not deflect before reaching the skid point S, but deflects upon reaching the skid point so as to reduce the outputs of the brake shoes 13 and 14 at the brake 10 with respect to the magnitude of the force input thereto.

Thus, when the brake lever is operated, the control spring 5 transmits the operating force of the brake lever to the Y-shaped arm 12 without deflection, from the start position C of press-contact of the brake shoes 13 and 14 with the braked portions at the bicycle wheel to the skid point S, thereby outputting a press-contacting force which is proportional to the operating force of the brake lever. After the output reaches the skid point due to the braking action resulting from the press-contacting force, the control spring 5 deflects to reduce its output (the press-contacting force) with respect to the magnitude of the force input to the brake 10, thus making it possible to exert the braking action in the range of skid point S until the brake lever is operated at the maximum stroke. Accordingly, since the control range of the brake lever can be enlarged at the skid point S, the braking efficiency and safety can be raised when the braking action is exerted within a predetermined braking distance. Also, when the braking action is exerted in order to reduce the bicycle speed on a downwardly sloping surface, the spring force of control spring 5 is preadjusted corresponding to a grade of the slope so that the control range can be enlarged at the region where a desired braking effect is required, thereby enabling improvement of the braking efficiency on the downward slope.

Also, the control spring 5, as described above, is adapted to deflect in a range of the maximum lever stroke of the brake lever, so that the best braking action can be exerted in fine weather. The press-contacting force at the skid point S on the braked portion at the bicycle wheel which becomes wet during rainy weather became higher than that in the fine weather, whereby the provision of control spring 5 makes it impossible to raise the press-contacting force up to the skid point S in rainy weather in the range of the maximum lever stroke. Hence, it is preferable in consideration of the braking action in rainy weather to limit an amount of deflection of the control spring 5 and lock the deflection thereof while the brake lever is operating at the maximum lever stroke so as to enable the braking action to be exerted at the skid point S in rainy weather.

In other words, as shown in FIG. 1, a locking portion 41 is provided at the receiving member 4 and a stopper 34 is provided in the housing 3 so that the control spring 5 deflects while the brake lever is being operated until the locking portion 41 abuts against a contact surface 34a at the stopper 34, thereby reducing the output of the operating members with respect to the magnitude of the input to be applied thereto. The locking portion 41 abuts against the contact surface 34a to lock deflection of the control spring 5, thereby impeding the movement of receiving member 4. After this, the output is not reduced with respect to the input up to the maximum lever stroke, thereby enabling the press-contacting force to be raised up to the skid point in rainy weather.

Thus, the control spring 5 can be deflected to exert the braking action at skid point S in the fine weather, thereby improving the braking efficiency, and moreover, it is ensured that the braking action can, in rainy weather, be exerted at the skid point while the brake lever is operating at the maximum lever stroke.

Figure 4:
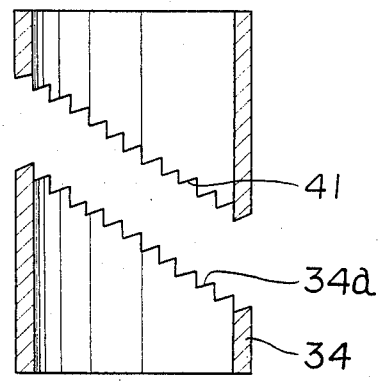
FIG. 4 is an illustration of a another example of stopper means when a control spring is locked with respect to its deflection.

Preferably the position for impeding the movement of receiving member 4 by locking the control spring 5 is made changeable by choice of the cyclist or the weather. In this embodiment, for example as shown in FIG. 4, the locking portion 41 and contact surfaces 34a are found in a circumferentially stepwise shape (or are continuously formed) to provide a plurality of impeding positions for the receiving member 4. The receiving member 4 is made rotatable and a control member 30 (which constitutes a selection means) to choose one impeding position of engagement of locking member 41 with the contact surface 34a is provided at the receiving member 4 and is rotatably operated to rotate the receiving member 4, thereby changing the position of locking member 41 with respect to the contact surface 34a.

Figure 6:
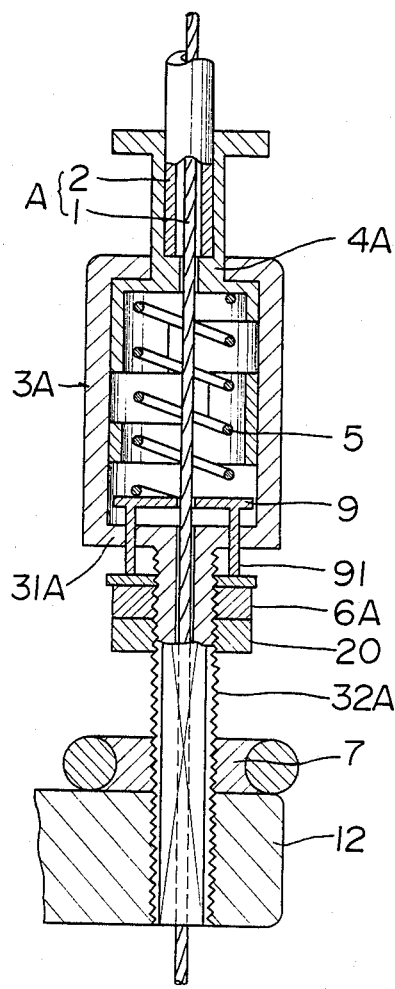
FIG. 6 is a longitudinal sectional view of a second embodiment of the invention.
Figure 7:
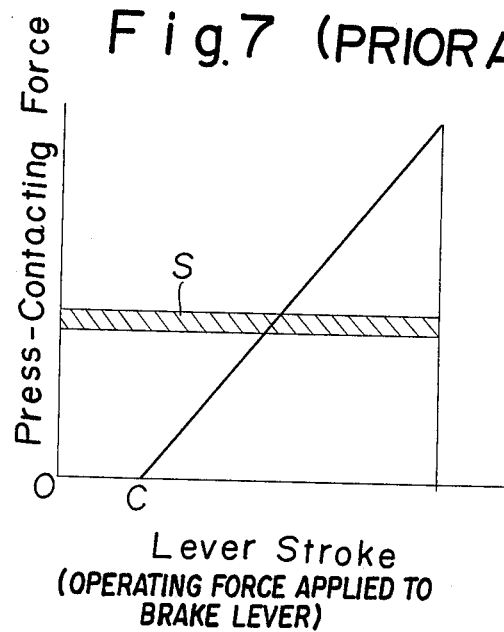
FIG. 7 is a graph illustrating the relationship between the lever stroke and the output of a conventional operating force transmission device.

Alternatively, as shown in FIG. 6, a spring holder 9 positioned opposite to a receiving member 4A to hold the control spring 5 may be axially movably provided at a housing 3A as shown and a plurality of association members 91 may project axially outwardly from the spring holder 9 and pass through bottom 31A of housing 3A. An adjuster 6A may screw with a mounting shaft 32A projecting from the bottom 31A and be rotatably operated to move the spring holder 5, thereby adjusting the spring force of the control spring 5. In addition, in FIG. 6, a reference numeral 20 designates a lock nut for the adjuster 6A.

Alternatively, the inner wire 1 may be supported at, for example, the brake side end to the receiving member 4 at the operating force transmission device connected to the arm 11 through the fixture 15. The outer sheath 2 may be divided so that one end of the divided outer sheath may be supported to the receiving member 4.

Alternatively, the housing 3 may be mounted to the Y-like-shaped arm 12 or the C-like-shaped arm 11 and also to the brake lever, the bracket member supporting it, or the bicycle frame.

The operating force transmission device of the invention may alternatively be provided at the brake 10, a brake operating device provided with the brake lever, or an intermediate portion of the control cable A. Also, the same may alternatively be used for an autocycle provided with a band brake or the like.

Although several embodiments have been described, they are merely exemplary of the invention and not to be construed as limiting, the invention being defined solely by the appended claims.

What is claimed is:

1. An operating force transmission device for a brake, for transmitting an input operating force applied to a brake lever to braking members of the brake through a control cable interconnecting the brake lever and the brake, the control cable comprising an inner wire disposed within an outer sheath, said device comprising:

a housing;

a receiving member supported movably relative to said housing and being adapted to retain thereto one of the inner wire and the outer sheath of the control cable;

a control spring means for deflecting responsive to a braking force output provided by the braking members of the brake exceeding a predetermined magnitude, to enable said receiving member to move relative to said housing when said predetermined braking force magnitude is exceeded so as to reduce a magnitude of a further braking force output of the braking members of the brake with respect to a magnitude of the input operating force supplied to the brake lever and transmitted to the braking members of the brake;

an adjuster means for adjusting a spring force of said control spring means to change said predetermined magnitude of said braking force output at which said control spring means deflects to enable said receiving member to move relative to said housing;

a stopper means for impeding movement of said receiving member relative to said housing in excess of a predetermined amount, said stopper means being provided between said housing and said receiving member and including a stopper having a plurality of impeding positions for impeding movement of said receiving member with respect to said housing; and a selection means for causing said receiving member to selectively engage with said impeding positions.

2. An operating force transmission device for a brake according to claim 1, wherein said impeding positions are formed in a stepwise shape on said stopper.

3. An operating force transmission device for a brake according to claim 1, wherein said impeding position are formed continuously on said stopper.

4. An operating force transmission device for a brake according to claim 1, wherein said housing comprises (i) a tube having a bottom portion at one lengthwise end thereof and (ii) a mounting shaft extending lengthwise outwardly from said bottom portion, an inner periphery of said other lengthwise end of said tube including a screw thread, said receiving member being movably housed within said housing, said adjuster means being screwably connected with said screw thread of said tube such that when said adjuster means is rotated relative to said tube, said receiving member is adjusted in position with respect to said housing, and said control spring means is interposed between said receiving member and said bottom portion of said housing.

5. An operating force transmission device for a brake according to claim 4, wherein said stopper means comprises a plurality of impeding positions for impeding movement of said receiving member toward said bottom of said housing, said selection means comprising an operating member which is rotatably operated to rotate said receiving member relative to said housing to select among said impeding positions with which said receiving member engages.

6. An operating force transmission device for a brake according to claim 1, wherein said housing includes a spring holder disposed opposite to said receiving member, said spring holder being supported movably with respect to said housing, said control spring means being interposed between said spring holder and said receiving member, and said housing being provided with said adjuster means for moving said spring holder to adjust a spring force of said control spring means interposed between said receiving member and said spring holder.

7. An operating force transmission device for a brake according to claim 6, wherein said housing includes at one lengthwise end a mounting shaft having at its outer periphery a screw thread, said adjuster means for said control spring means being screwably engaged with said screw thread, and said spring holder being provided with engagement members in engagement with said adjuster means.

* * * * *